No. 847,042. PATENTED MAR. 12, 1907.
J. BERK.
HOSE COUPLING.
APPLICATION FILED DEC. 10, 1906.
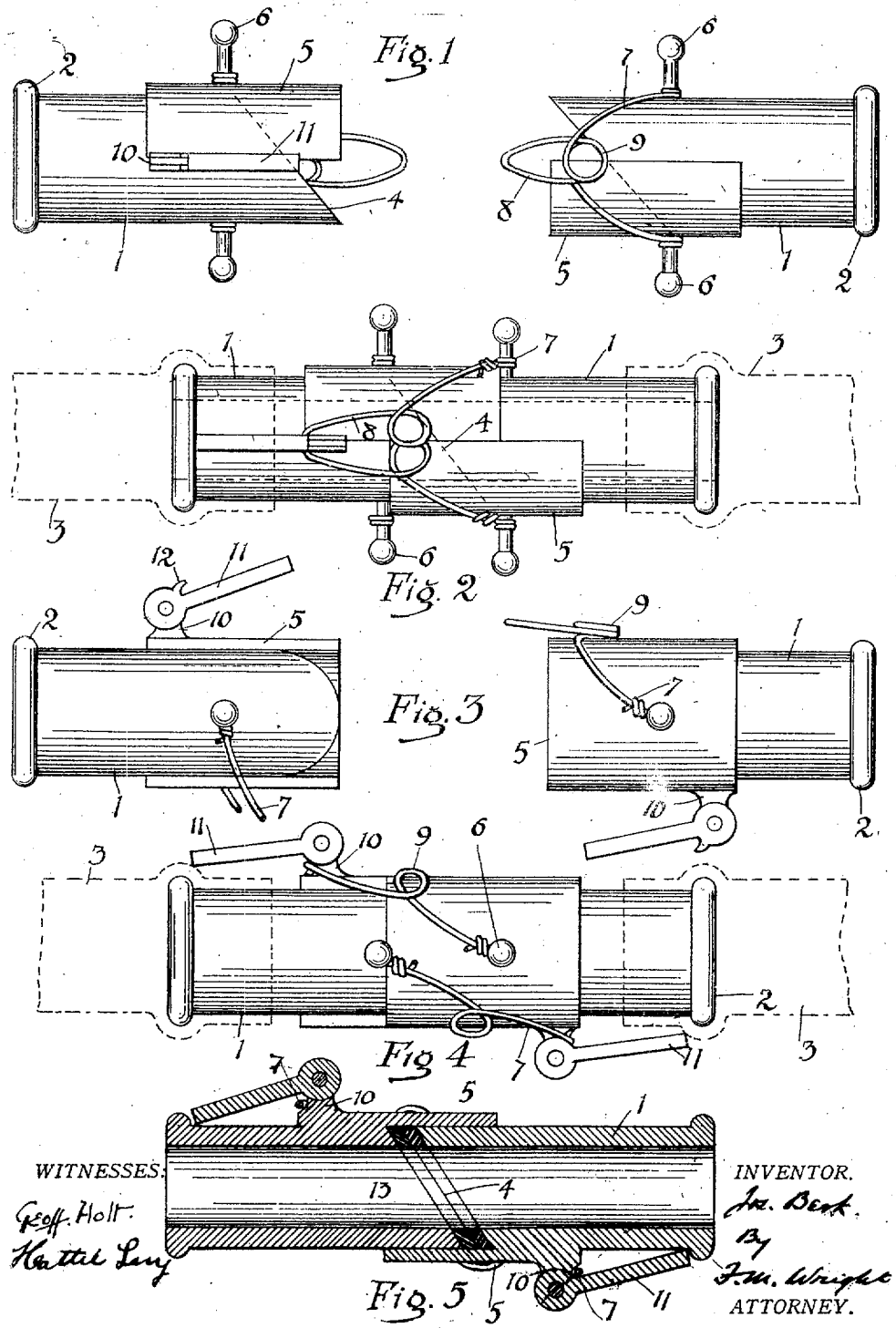

UNITED STATES PATENT OFFICE.

JOSEPH BERK, OF SAN FRANCISCO, CALIFORNIA.

HOSE-COUPLING.

No. 847,042.

Specification of Letters Patent.

Patented March 12, 1907.

Application filed December 10, 1906. Serial No. 347,233.

*To all whom it may concern:*

Be it known that I, JOSEPH BERK, a citizen of the United States, residing at San Francisco, in the county of San Francisco and State of California, have invented new and useful Improvements in Hose-Couplings, of which the following is a specification.

This invention relates to improvements in hose-couplings, the object of the invention being to provide an improved form of hose-coupling the members of which shall be interchangeable, so that the end of any piece of hose furnished with one of said coupling members can be immediately attached to the end of any other piece of hose so furnished, the parts of which can be very quickly attached and which will be strong and durable in construction.

In the accompanying drawing, Figure 1 is a side view of the coupling members detached. Fig. 2 is a similar view of the same coupled. Fig. 3 is a plan view of the coupling members detached. Fig. 4 is a similar view of the same coupled. Fig. 5 is a longitudinal section of the members coupled.

Referring to the drawing, 1 indicates the body of the coupling member, cylindrical in form and having a terminal rib 2 for the purpose of retaining in position on said member the hose, (shown in dotted lines at 3.) The inner end of the coupling member is formed oblique with the axis of said member, as shown at 4. Overhanging the retreating side of said oblique end is a semicylindrical guide 5, the function of which is to guide into and hold in position the projecting side of the oblique end of the opposite coupling member. Diametrically opposite to each other, one at the center of said guide 5 and the other on the main body 1, are two lugs 6, around which are secured the ends of springs 7, each comprising a central loop 8 and coils 9, the latter being for the purpose of furnishing additional resiliency to the springs. On the opposite side of each member from that on which the spring rests is formed a short standard 10, upon which is pivoted an arm 11. Said arm is adapted to be inserted through the loop of the spring on the opposite member, and said arms when turned through nearly two right angles extend said springs so as to firmly clamp the two coupling members together. The loop of the spring is received between the base of the arm 11 and a lip 12, the function of said lip being to positively raise the loop of the spring and release it when the arm 11 is thrown back to its original position. Elliptical rubber washers 13 are interposed between the ends of the members to make the coupling water-tight.

The operation of the device is very simple. The two coupling members are brought together, the projecting part of the oblique end of each entering the cylindrical guide of the opposite coupling member. In this position the loops of the springs will readily assume a position over or outside of the arms 11, whereupon by turning said arms through nearly two right angles the springs are extended, and the coupling members firmly clamped together. It will readily be seen that the two coupling members being identical in form each member can quickly be attached to coupling members of like character on another piece of hose.

I claim—

1. A hose-coupling, the two members whereof are identical in form, each comprising a spring having a loop and a pivoted arm adapted to engage the spring of the opposite member and extend the same, substantially as described.

2. A hose-coupling, the two members whereof are identical in form, each comprising a spring attached at its ends to the member, the middle portion forming a loop, and a pivoted arm adapted to engage the spring of the opposite member and extend the same, substantially as described.

3. A hose-coupling, the two members whereof are identical in form, each comprising a spring attached at its ends to the member, the middle portion forming a loop and the sides being coiled, and a pivoted arm adapted to engage the spring of the opposite member and extend the same, substantially as described.

4. A hose-coupling, the two members whereof are identical in form, each comprising a spring having a loop and a pivoted arm adapted to engage the spring of the opposite member and extend the same, said arm having a lip to engage the loop to release the spring when the arm is reversed, substantially as described.

5. A hose-coupling, the two members whereof are identical in form, each comprising a spring having a loop and a pivoted arm adapted to engage the spring of the opposite member and extend the same, each member having an oblique end and having also a guide covering the inner or retreating portion of said end, of the other member, substantially as described.

In testimony whereof I have hereunto set my hand in the presence of two subscribing witnesses.

JOSEPH BERK.

Witnesses:
 FRANCIS M. WRIGHT,
 D. B. RICHARDS.